INVENTORS.
VLADIMIR H. PAVLECKA.
JOHN K. NORTHROP.
BY
ATTORNEYS.

Patented Jan. 21, 1947

2,414,551

UNITED STATES PATENT OFFICE 2,414,551

COMPRESSOR

Vladimir H. Pavlecka, Pacific Palisades, and John K. Northrop, Los Angeles, Calif., assignors to Northrop Aircraft, Inc., Hawthorne, Calif., a corporation of California Original application July 21, 1941, Serial No. 403,338. Divided and this application October 6, 1941, Serial No. 413,781

6 Claims. (Cl. 230—119)

This invention relates to compressors for gas turbines of the continuous combustion type operating at substantially constant pressure, according to the Ericsson thermodynamic cycle, sometimes erroneously called the Brayton cycle. Although the theory of such turbines has long been known, and some have been put into actual commercial operation as stationary power plants, relatively little has been so far accomplished in the development of gas turbine power plants for driving purposes in transportation, particularly for airplane propulsion.

This application is a division of our prior application Serial No. 403,338, filed July 21, 1941, entitled "Gas turbine."

The present invention deals with a compressor used in a gas turbine power plant specifically conceived for airplane propulsion use, although its utility can be extended to other fields where compact, light and efficient compressors are in demand.

A gas turbine power plant becomes commercially attractive when its thermal efficiency reaches values comparable to the efficiency of existing reciprocating thermal power plants. It will be apparent to those familiar with thermodynamics that good thermal efficiencies of gas turbines can be obtained if either the maximum cycle temperature is increased or the thermodynamic efficiencies of the turbomachines improved or, preferably, if both are increased at the same time.

So far, gas turbine power plants have not come into wide use partially because of difficulties with metals under stress at high temperatures of combustion gases, and also due to the insufficiently high thermodynamic efficiencies of turbines and compressors obtainable with the existing knowledge of aerodynamics.

To those familiar with the problem, it will be apparent that in the thermodynamic expression for the overall thermal efficiency of a gas turbine power plant, the thermodynamic efficiency of the turbine is a very significant and determining factor, more so than the thermodynamic efficiency of the compressor which it drives.

The attainable thermal efficiencies of gas turbine plants rise rapidly with the increase of the maximum cycle temperature at which the propulsive gases may be used in the blading, so rapidly in fact, that the difference between a maximum cycle temperature of say 1450° F. and 1200° F. may constitute the difference between a commercally advantageous design and one which is inferior in performance to other types of existing thermal prime movers.

The difficulties attendant upon high temperature of the propulsive gases manifest themselves in various ways. One of the most important of these is the "creep" or gradual deformation of material under stress. The rate of creep varies with the stress and also with the temperature. The variation with stress is approximately linear, but the variation with temperature is exponential, i. e., the rate of creep increases in geometric ratio while the temperature is increasing in arithmetic ratio. The phenomenon constitutes the greatest obstacle to the use of high temperature thermodynamic cycles in gas turbine plants. If the turbine blading or its supporting structure creeps, there will eventually come a time when the clearance between the rotor and stator disappear, and replacement of these parts is necessary. Therefore, if the turbine be designed with small clearances and very low stage leakage for initially high thermodynamic efficiency, and the temperature of the gases in the first stages of the turbine also be high for the same purpose, it is quite possible that the creep rate will be so high that replacement of the turbine components will be necessary in a relatively short time, and that savings due to high thermal efficiency will be more than offset by large rebuilding costs.

Reduction of unit stresses, of course, delays this effect, but it also increases weight and size of moving parts, and hence not only increases the initial cost, but defeats the hopes for obtaining a light and compact power plant.

The second major problem introduced by high temperatures has to do with heat insulation. Heat transfer to the surroundings of the machine, as well as adverse heat flow internally within the power plant become increasingly important with high cycle temperatures. External heat flow is, of course, pure waste. The internal heat transfer by conduction and radiation between various units of a gas turbine power plant manifests itself as a deterioration of the thermodynamic cycle. This latter loss is particularly important in a compact, light weight power plant for aircraft purposes, because here the compressor and the turbine units have to run in the closest possible proximity to one another, besides being both near the combustion chamber with its high temperature.

As is well known, an air compressor operates more efficiently along an isothermal compression line, i. e., with internal cooling or at least with interstage cooling. In a continuous combustion gas turbine of a compact design, constructed integrally with a compressor and a combustion chamber and without specific means for heat insulation, heat would flow, principally by radiation, to the compressor and force it to operate with stage heating instead of cooling.

The problems thus briefly set forth are interrelated, and are, moreover, complicated by a number of additional factors, e. g., vibration damping properties of metals used for the construction of the turbine blading. The turbine blades exposed to high temperature gases have to be made of special heat resisting, non-oxydizing alloys which possess very low creep rates. An important disadvantage of these alloys is their low internal cohesive friction at high temperatures, physically defined as low damping coefficient. Parts of turbines made of these materials, e. g., bladings, are easily excited into violet vibrations even outside the region of resonance with the exciting forces, and develop fractures. The turbine structure using these alloys has to be designed with this condition in mind, viz., to restrain the blades against dangerous vibrations without detrimentally affecting the performance of the turbine as an aerodynamic machine.

It is obvious however, that no turbine structure can be efficient without the use, in combination therewith, of a compressor of high efficiency so designed as to deliver to the turbine air at the proper temperature and in the proper condition for use by the turbine. Inasmuch as the compressor is driven by the power-plant when it is used with our gas turbine, the power consumed in the compressor is of course a direct subtraction from the available power of the machine. It is therefore imperative that every precaution be taken to promote efficiency in the compressor and to provide the output air required, with a minimum of power absorption.

Broadly, our present invention comprises a compressor which may be said to have three stages. First, a turbine type of compressor in which the flow is axial; second, a first centrifugal stage fed by the turbine type compressor; third, a second centrifugal stage, the output of the second centrifugal stage being utilized, for example, in the turbine to be described herein.

Among the objects of the invention are: To provide a rotary compressor combining turbine and centrifugal compressor stages; to provide a novel means and method of transferring air between two centrifugal compressor stages; to provide a means and method of reducing entrance shock in a centrifugal compressor; to provide a means and method of coupling a turbine stage compressor with a centrifugal type compressor, and of coupling two centrifugal stages in a centrifugal compressor; to provide a combined turbine and centrifugal type compressor occupying a minimum of space and of minimum weight; and to provide a simple and efficient compressor, ideally adapted for use in conjunction with gas turbines.

Our invention possesses numerous other objects and features of advantage, some of which, together with the foregoing, will be set forth in the following description of specific apparatus embodying and utilizing our novel methods. It is, therefore, to be understood that our method is applicable to other apparatus, and that we do not limit ourselves in any way to the apparatus of present application, as we may adopt various other apparatus embodiments, utilizing the method, within the scope of the appended claims.

Fig. 1 constitutes a one-half longitudinal sectional view of a gas turbine power plant embodying our invention, divided into three sections to reduce length.

Figure 1:
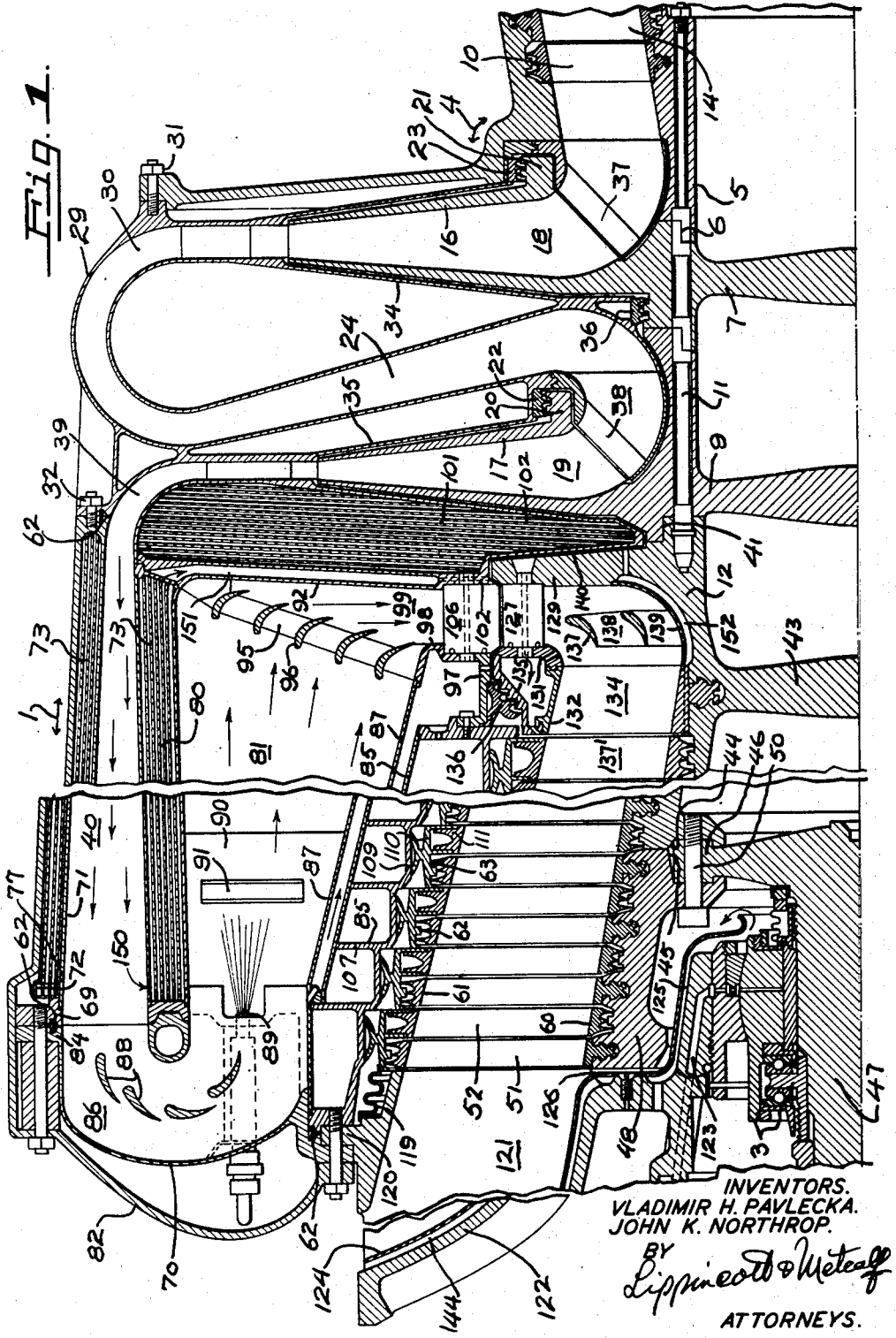
Figure 2:
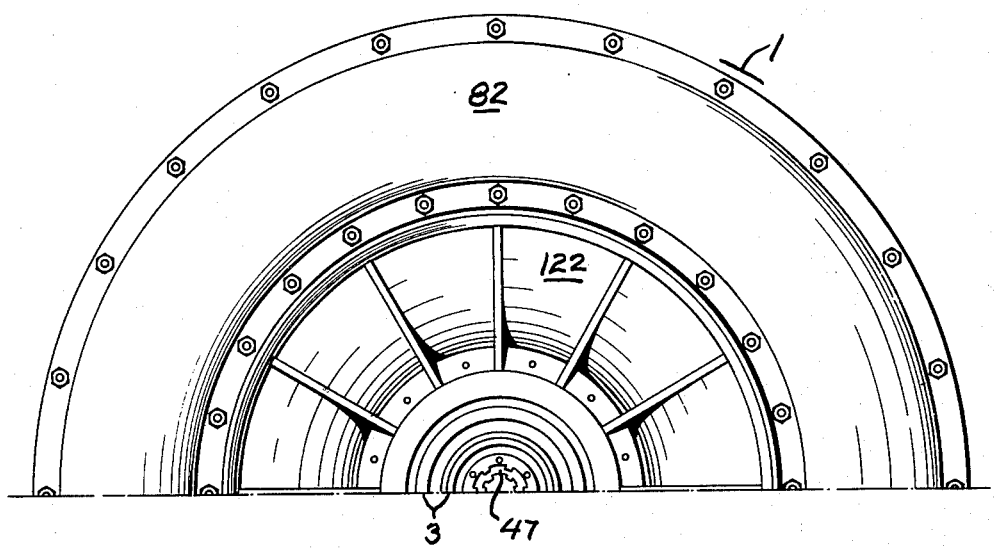
Fig. 2 is a half end view of the turbine of Fig. 1.
Figure 3:
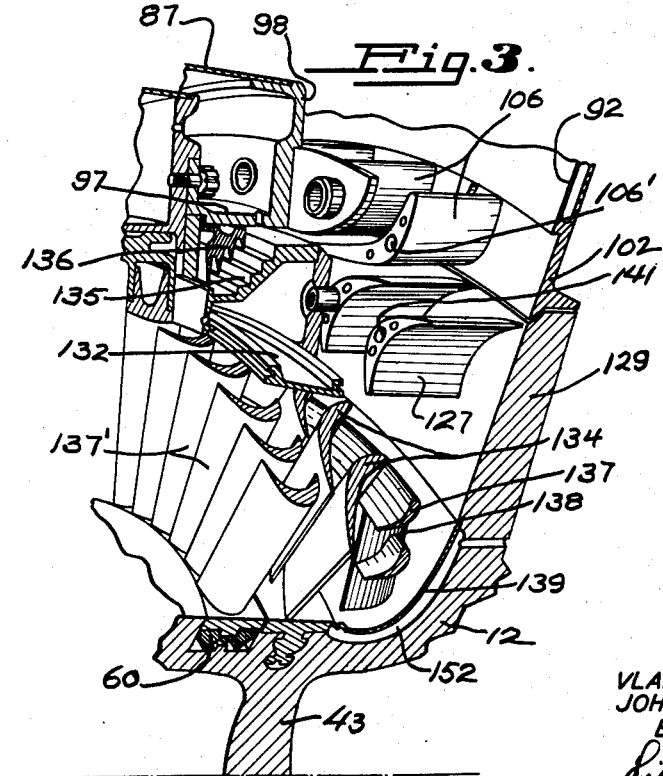
Fig. 3 is a diagrammatic perspective view of the blade arrangement in the path of the heated gases while changing from inwardly radial to outwardly axial flow.

The turbine whose design we have chosen to describe as illustrating our invention, comprises a stator shell which although sectional is indicated by the general reference character 1, split axially in a horizontal plane, with the two stator halves bolted together by flanges, and carrying at one end a main journal bearing 3, of the rotor, the other bearing of the rotor being carried by the compressor stator section 4 of the gas turbine power plant, this bearing not being shown.

The rotor of the power plant is a composite structure built up from a number of elements. Considering these elements in order, starting from the intake portion of the compressor at the right of Fig. 1, they comprise a steel hollow shaft 5 provided with a shoulder 6 bearing against a first centrifugal section 7, which in turn interlocks with a second centrifugal section 9, the shaft and the two sections being held together by bolts 11 entering turbine rotor frame portion 12. The shaft portion of the rotor carries axial compressor reaction blading 10 and tapers from the maximum diameter at the intake end to a minimum diameter adjacent the first centrifugal compressor section. Reaction blading 10 is spaced and stator blades 14 are attached to the compressor stator 4 between each series of rotor blades. The axial compressor blading is of the reaction type, with profiles, generated according to the laminar flow principles, similar to Joukowsky airfoil type (reference—page 67 of Aerodynamics of the Airplane, by Clark B. Millikan). The insertion and sealing of these blades is substantially the same as that of the turbine blades, and will be described more fully in conjunction with the action of the turbine. Like all other elements of the rotor hereinafter described the compressor rotor is machined inside and outside for accurate balance.

Centrifugal section 7 is prolonged laterally and carries a first centrifugal impeller 16, and the second centrifugal section 9 carries a second centrifugal impeller 17, both formed integrally with the sections. Both of the impellers carry impeller bladings 18 and 19 respectively, which are substantially conventional in form and preferably assembled in the impellers by copper brazing in a hydrogen atmosphere. Each of the impeller sections carries a shoulder 20 and 21 respectively, extending parallel to the axis of the machine and these shoulders are provided with labyrinth seals 22 and 23 respectively. Seal 23 is made between the compressor housing 4 and the impeller shoulder, the seal 22 being made between the impeller shoulder 20 and the inlet duct 24 leading to the second impeller 17.

The periphery of impeller 16 discharges into a transfer casting 29 having a transfer passage 30 which leads into inlet passage 24 of the second impeller. The transfer casting 29 is bolted to the compressor stator 4 on one side by bolts 31 and to the turbine shell 1 on the other side by bolts 32. Transfer casting 29 also carries a first impeller enclosure 34, and a second impeller enclosure 35, both adjacent and surrounding the impellers. The right-hand portion of enclosure 35 aids in supporting seal 22 for the second impeller. At the lower portion of inlet passage 24, casting 29 is sealed to centrifugal section 7 by a labyrinth seal 36.

A special entry blade 37 is positioned to receive the air from compressor blades 10 and 14, and to direct the air into the rotating blades of the first impeller 16, with a radial component of flow to eliminate entry shock. Thus the angle of the entry blade 37 adjacent the impeller blades 18 is at an acute angle to the shaft looking from the intake end. Similarly a stationary blade 38 is attached to transfer casting 29 to direct the air into the second impeller 17 at substantially the same angle to likewise eliminate entry shock at this point.

Immediately around the periphery of the second impeller 17 is positioned a compressor outlet passage 39 curved to direct the air in a direction parallel to the axis of the machine into the turbine portion, and into an annular and outer expansion passage 40. All of the rotative elements so far described operate at relatively low temperatures and can be machined from austenitic type of steel.

The next section 12 of the rotor, however, carries the initial turbine stages and is turning in gases of high temperature. For this reason this section is preferably constructed of a low creep rate alloy, such as that designated in the trade as "K-42-B alloy." Thus, the rotor frame portion 12 is made of this alloy and as previously explained, is held to impeller section 9 by bolt 11 and is positioned by means of mating surfaces 41. The turbine rotor is made in sections, the first section 12 being provided with a web 43, and terminating in a groove 44, which, with opposing groove 45 of the final section 48 of the turbine rotor forms a channel for the reception of an annular retaining shoulder 46 forming a part of a power stub shaft 47 from which the power is taken. The rotating portion of bearing 3 is mounted on shaft 47, matching the stationary portions of the same bearing attached to the turbine case 1. The two rotor sections 12 and 46 are held on annular shoulder 46 by a bolt 50. Turbine impulse blades 51 are attached to the rotor sections between rows of reaction blades 52 attached to the stator. Both rotor and stator have special entrance blades which will be later described.

It can be seen that the rotor thus described, although it contains no continuous central shaft, can be built with great accuracy and rigidity. The mating surfaces of the adjacent sections of both compressor and turbine rotors can be easily finished to a high degree of precision. It is these engaging cylindrical surfaces which determine the alinement of the entire rotor.

Turning our attention next to the blading. One of the major energy losses in turbomachines is the external and internal leakage. The external leakage loss is practically eliminated in our invention, because the high pressure end of the compressor is directly adjacent to the high pressure turbine end, without the presence of an intervening bearing as is the case in other gas turbines. We not only do not have to resort to extremely complicated and delicate seals to retain high pressures of gases at high temperatures, but we actually create conditions under which we are able to meter a certain amount of air leakage for cooling and insulating purposes, as will be apparent later on in this description.

Internal leakage is not combatted in the prior art of turbine designing at all, in spite of the fact that it adversely influences the thermodynamic efficiency of the turbines. Internal leakage can be defined as leakage of gases past the blade stages without doing useful work on the blades. It not only constitutes a direct and non-recoverable loss of gas energy, but also has an adverse indirect effect upon the flow of gases through blade cascades, in that it disturbs the two-dimensional flow of gases and induces it to deviate outwardly in the direction of the blade tips. This flow then sets up a tip vortex at the end of each blade which is the source of the so-called induced drag. For blades of low aspect ratio, such as are common in the high pressure stages of elastic fluid turbines, this drag is of considerable importance, because in elastic fluid turbines the absolute velocity of the leaking gases is higher than the relative velocity of the gases expanding in the blade cascades and the tip vortex is then extremely strong.

In our invention the individual blade stages are sealed along their peripheries by labyrinth flanges to reduce the stage leakage to the very minimum, and also to remove the place of leakage away from the tips of the blades, so that even if a slight leakage does occur through the labyrinth seal, it has only a remote influence on the two-dimensional flow through the blade cascades.

The ends of both stationary, as well as rotary blades, are encastréd by a shroud 60 and 61 respectively. Each of these peripheral shrouds carries a plurality of stage sealing flanges 62, bearing on seal seats 63 on the opposing member. The sealing flanges are originally machined to a close fit and are run in by external power before the turbine is actually used for the first time. We apply this method of stage sealing to the turbine stages as well as to the axial flow compressor stages, and seals 22, 23 and 36 previously described are of this type.

The pressure developed at the outlet of the final centrifugal stage is somewhere in the neighborhood of 7 atmospheres, and the compression, being as nearly as possible adiabatic in a power plant for transportation purposes, the exit air temperature runs in the neighborhood of 500–600° F. At such temperatures organic gasketing materials are not ordinarily satisfactory, in view of the accurate fits and small clearance to which the power plant is preferably constructed. Leakage at the various stator housing joints is, in our invention, prevented by special self-sealing rings 62, as described in the patent to Daniel F. Egger, No. 2,303,114, of November 24, 1942. These sealing rings are made of elastic material such as spring steel, and are convex in the direction along the joint from which the fluid pressure is applied. The internal pressure tends to flatten out the sealing ring and forces it to make a better contact with the housing so that the tightness of the seal improves with increasing pressure.

The major diameter wall 71 of the annular duct 40 terminates in a steel ring 69 to which the end section 70 of the housing 1 is bolted. The inner wall 71 of the duct is welded to this ring. Also welded to the ring 69 immediately outside of the wall 71, is an annular fitting 72 which carries a series of spaced polished stainless steel reflector plates 73 extending between wall 71 and housing 1. The reflector plates, although generally circular, are not accurate circles, but are preferably waves in outline. These reflector units are preferably made in segments to permit pressure equalization between the plates. This pressure is admitted through a port 77 at the outlet end of the duct, and is held by the outer casing. It will be noted that there is no actual circulation in the space between the inner wall 71 of the duct and its outer wall, the latter being part of housing 1.

As will be shown later, the burner chamber is surrounded by the duct 40. The gases within the burner chamber are at very high temperature, and accordingly tend to radiate. The highly reflective steel plates tend to reflect the radiation back toward the center of the device, and there is a rather high temperature gradient between the inner and outer walls of the duct 40. This minimizes heat loss and tends to keep the outer casing of the turbine relatively cool. The mechanical strength to withstand the pressure within the duct is provided by the outer wall, and since this is relatively cool compared with the inner wall it can be much lighter than it would be were the stress carried by the hotter member.

The terms inner and outer walls, as used thus far, have referred to the multiple elements of the major diameter wall of the annular duct 40. The minor diameter wall of this duct is formed by a similar and slightly thicker multiple structure designated generally by the reference character 80. This minor diameter wall also forms the outer or major diameter wall of a reflexed inner duct which forms the combustion or burner chamber 81. The pressure on the two sides of the wall 80 is nearly the same, and the mechanical strength of this wall need not be great. Here again polished steel plates 73 are positioned in the wall to reflect heat tending to radiate outwardly.

The duct 40 reflexes into the inner combustion chamber 81 through the semi-toroidal end casting 70 which is outwardly bolted through ring 84 to the ring 69. The center of the toroid is mounted on the end of the stator core 85 supporting the remainder of the toroid by means of radial, spaced spoke-like vanes 86. The core 85 projected toward the compressor serves as support for a dividing wall 87 between the combustion chamber and the core. Casting 70 is outwardly covered by end portion 82 of housing 1.

Gases flowing from the outer duct 40 and combustion chamber 81 are guided through end casting 82 by a series of spaced and offset vanes 88, preferably of airfoil section, supported on the radial vanes 86. Vanes 86 also serve as an end support for dividing wall 80. The vanes 86 are also preferably of airfoil section, and carry burner jets 89 which discharge at the trailing edges of the vanes 86 in a conical spray whose general direction is parallel to the airflow. At that portion, as is described in the patent to Dallenbach and Northrop, No. 2,296,023 of September 15, 1942, there are preferably at least six of these burner jets disposed equi-angularly about the periphery of the turbine axis, and each jet discharges into the space between two divergent vanes 90, of airfoil section, and in stalled position with relation to the airflow.

The conical spray from the burner jet impinges against igniter elements 91 set into the surface of the vanes 90, and is ignited thereby. There is an intense turbulence set up by the action of the stalled vanes exactly as such a turbulence is set up on the upper surface of an airplane wing when the wing stalls. This aids the speedy and thorough combustion of the fuel. The temperature between the vanes may be extremely high, on the order of 3,000° F. to 3,600° F. A portion of the air, however, passes between adjacent pairs of vanes 86, and does not take part in the combustion. After passing the trailing edges of the vanes this relatively cool air enters the area of turbulence set up by the vanes 90, and is thoroughly mixed with the burned gases, thus reducing air temperature to around 1,450° F. as the gases approach the rotor.

The structure at the inner end of the combustion chamber or duct 81, comprises an end wall 92 forming a part of casting 29, angularly joined to the minor diameter wall 80. This end wall carries a series of inwardly projecting spokes 95 of airfoil section. These spokes carry guide vanes 96 for directing the axially flowing gases radially inward. The inner ends of the spokes 95 are attached to an abutment ring 97 which forms an abutment for the inner wall 87 of the combustion chamber, and also provides a nozzle support ring 98 which forms one wall of the radial duct 99 into which the gases from the combustion chamber discharges. The opposite wall is formed by an extension 100 of end wall 92, this extension joining casting 35 adjacent impeller 17 to provide a thick hollow diaphragm 101. Diaphragm 101 is internally provided with a plurality of polished insulating plates 102 similar to plates 73. Radial expansion nozzles 106 are mounted between abutment ring 98 and extension 100. The abutment ring 98 is also secured to the main reaction turbine frame core 85, which comprises a plurality of annular integral diaphragms 107, which are integrally connected by and support a series of accurately cylindrical blade seats 109, which form an expanding, stepped internal cone. Blade support rings 110, provided with spring flanges 111, are press-fitted within the blade support seats, as is described in a copending application of Pavlecka, Serial No. 385,105, filed March 25, 1941. Each of the blade support rings carries the previously mentioned row of reaction type stator blades 52, and the labyrinth seal seats 63. As in the case of the compressor, both the stator blades 112 and the rotor blades 115 are encastréd, not only to provide the labyrinth seal flanges 62 respectively, but also to minimize vibration.

Each of the blade support rings 110 bears against the preceding next smaller ring of the series. The press-fit of the rings is normally sufficient to hold them in place, but in order to prevent successive expansion and contraction of the seats from gradually shifting the position of the blades, they are kept in compression by an annularly curved compression spring 119. This spring bears against ring portion 120 of housing 1 to which both the toroidal casting 82 and the core 85 are bolted. The ring 120 is supported by vane-like spokes 121 which connect the ring 120 to an inner casting ring 122. Casting rings 120 and 122 define a flaring annular exhaust passage for the spent gases. The casting 122 is protected between spokes 121 from direct action and erosion by these gases by a deflector plate 124. The stationary part of main bearing 3 is mounted on the casting 122 and beneath the deflector plate 124 is an air passage 144 through which cool air is drawn from around the exhaust to cool the bearing 3, this air passing through ducts 125 and 126 to enter the exhaust stream. Oil is supplied to bearing 3 through oil duct 123.

It will be obvious from what has been said at the outset of this specification that the critical point in this turbine, as in all past turbines, is the initial stage where the temperatures are highest. The propulsive gases are expanded very rapidly in the stator nozzles 106. As will be seen in Fig. 1, these stator nozzles are short, they are supported at both ends, they are not subjected to rotational stresses and as will be seen later, are air cooled. They are made of anti-creep alloy. It will be recognized that their strength is ample for the duty to which they are subjected. Owing to the large expansion that takes place in these stator nozzles 106, the temperature of the propulsive gases drops rapidly therein, and by the time these gases have reached the first rotor blades their temperature may be dropped from 150° to 200° F., depending upon the detail of the design. However, in spite of the cooling which has taken place in the expansion through the stator nozzles 106, the gases impinging upon the first rotor blades 127 are very hot, and these blades are, of course, subject to rotational stress. They are radial impulse blades and their unconventional design is to enable them to withstand these stresses.

This design is predicated upon the fact that unlike most rotor blades, they are supported at both ends. The inner end, closest to the compressor is supported on a ring 129 forming a part of first rotor section 12.

The other, or outer ends of the rotor blades 127 are supported by a ring 131 which connects with a second ring 132. The latter ring forms the shrouding for a second set of rotor blades 134 set at right angles to rotor blades 127. The rings 131 and 132 are tied together by a third ring 135 which forms the seat of labyrinth seal 136 carried by the stator structure.

The change in direction between rotor blades 127 and rotor blades 134 is aided by curved airfoil blades 137 mounted on rotating standards 138, the latter being connected to diversion wall 139 connecting the bases of rotor nozzles 134 with ring 129.

The rotor thus carries two successive sets of bladings, the radial blades 127 and the axial blades 134, with no stator bladings intervening between the two. The first set of bladings 127 is adapted for inwardly radial flow and is impulse type blading. The second cascade of blades 134 may be of either of two types. In one case these blades may be purely directional vanes which give a peripheral direction to the axial stream of gases coming from the radial blades 127. In this case a high exit velocity from blades 127 would be used, and in many cases such a high velocity would be undesirable because of high frictional and turbulence losses in the duct between the two blade cascades. We prefer, therefore to use a lower exit velocity and to design blades 134 as expansion nozzles, and thus add to the gas velocity of the gases entering them. If this latter construction is used, the gases from blades 134 will discharge into the first row of characteristic reaction type blades 137' mounted on the stator.

The unconventionality mentioned above in this preferred structure is three-fold. First, the flow is inward instead of outward as in the ordinary radial flow turbine. This permits the use of an impinging angle against the first rotor blades 127 of only 9½° instead of the more usual 14°, which results in a very high peripheral efficiency of the stage. Could cantilever blades be used, so that the blades 127 could be of conventional form, it would be theoretically possible because of this low angle to get a thermodynamic efficiency of approximately 84° out of this stage. In steam turbines, where the temperature is lower, such an inward flow axial impulse stage would be highly desirable. This fact is not self-evident, and where radial flow has been used in turbines in the past, it has been, so far as we are aware, always outward. With outward flow the impinging angle is increased above that possible with axial flow turbines, but since outward flow gives room for the natural expansion of the gas, outward flow is the expedient to which the engineer naturally turns.

Here, however, instead of the gases discharging from the buckets 127 into stator blading, they discharge into a passage and are guided from the radial into the axial direction by the walls of this passage plus the guide-vanes 137, rather than having the buckets 127 arranged so as to themselves guide the exhaust gases in such direction. The angles of admission of both series, are substantially the same, relative to the blades and the blades receive the gases almost tangentially and discharge them almost radially. The exhaust angle is preferably such that the discharged gases are rotating with the rotor structure at an angular velocity which is equal to the mean velocity at the entrance of the expansion nozzles 134 on the rotor. i. e., the absolute velocity of the gases is slightly less than that of the buckets 127.

The effect of the relationship set forth is a great apparent reduction in the efficiency of this stage of the turbine, but this reduction in efficiency is more apparent than real, for the discharged gases still retain a velocity which is recovered as mechanical work in the succeeding stages. The calculated efficiency of the radial stage shown is only 58.6%, but this does not mean that 41.4% of the energy of the adiabetic expansion of the gases is lost, but only that 25.9% of the useful mechanical energy of the gases is not intercepted in this stage but passes on to the axial reaction stages to do useful work.

As has been stated, the temperature drop in the radial stage is approximately 150° to 200° F. The expansion which takes place in the nozzles 134 further reduces the temperature of the gases, so that a relatively conventional design is used in the stages from this point on to the exhaust.

Even with the blading 106 and 127 supported at both ends in order to provide long life, it is desirable that these blades should not reach the full temperature of the gases, and means are therefore provided for cooling them. A space 140 is provided around diaphragm 102 which admits a predetermined quantity of air directly from the exhaust of the final compressor stage to the compressor side of ring 129 supporting the blading 127. The blading 127 is provided with longitudinal holes 141, and the air admitted through the space 140 passes through these holes, thus cooling the blades 127, this air discharging between blades 134 and 137'. Space 140 also continues above blade 127 and a small amount of air may enter the space between blades 106 and 127.

In addition an air port 150 is provided at the end of duct 40 to sap off some of the air before it has been heated so that it may enter the space between plates 73 in the minor diameter wall 80, pass along the plates to a space 151 between end wall 92 and plates 102 of the main diaphragm 101 between the compressor stage and the turbine stage, this air discharging through holes 106' in each nozzle 106 into space between wall 87 and core 85 from which it is vented through part 97 to the adjacent edges of blades 106 and 127. Air also enters between wall 87 and core 85 adjacent the burners and is vented through part 97.

Furthermore, space 140 is connected with the space 152 back of deflector plate 139, this air cooling the plate and exhausting in back of rotor blades 134. Thus, blades 106 and 127 are cooled by air passing through the metal thereof. The leading edge of blade 127 is cooled by air fed thereto and the leading edge of blades 137' is cooled by the vented air as it passes into the reaction stages. The rotor air comes from the compressor directly, the stator air is sapped off adjacent the burner.

In discussing the action of the turbine in its various important aspects, it will be seen first that the compressor end of the machine is a combination of a turbine type compressor and two centrifugal stages. Important in this regard is the transfer of the air from the preceding stages into the impellers of the centrifugal stages, in that the transfer takes place with a radial component of flow and therefore entrance shock is reduced. The reflexed duct 30 between the two impeller stages is expanded as little as possible, with no expansion whatever during the turning of the gases from outwardly radial flow to inwardly radial flow. Even then, during the remainder of the inwardly radial inlet passage 24 to the second impeller stage, very little enlargement of the duct occurs. This type of connection between the two impellers transfers the air between the two impellers with substantially no expansion, and therefore little change from dynamic energy into potential energy occurs. The air, when it reaches the input to the second impeller stage retains substantially all of its dynamic energy produced by the first impeller stage. Similarly, the outwardly moving radial air, coming from the second impeller stage, is turned to axial direction without substantial loss of dynamic energy. No great change to potential energy takes place until the air reaches the annular duct 40. At this point expansion will take place and the air will reach the burners in proper condition for mixture with the fuel. Furthermore, the compressor and turbine stages are insulated against the hot gases by the use of the relatively thick diaphragm 101 formed by polished plates 102, so that there is relatively little heat interchanged between the combustion chamber 81 and the compressor.

In addition, both the major and minor diameter walls of the outer passage 40 are insulated by polished plates 73. The combustion chamber 81 is further insulated from the outside of the turbine because it is surrounded by passage 40 in which the air itself acts an insulating cloak to reduce the escape of heat. The gases are heated in axial flow and are then turned inwardly for a first and radial contact with the rotor structure and then are turned axially, without the interposition of stator blades, to do additional work on rotor blades 134. The gases thereafter in axial flow act in conventional manner on the bladings 52 and 51, with the exhaust passage continually becoming larger in cross-section up to the exhaust. Bearing 3 is not only cooled by air but is also protected from the heated gases by the structure used. Creep throughout the machine is prevented from causing any significant losses first, by using the proper metals for the bladings and second, by the use of shrouds, which provide under surface air ducts for insulation of main structural components from high temperature gases.

Thus all the advantages heretofore pointed out are attained in a relatively light structure suitable, for example, for being used as a compact prime mover for an airplane or in any other place where lightness and efficiency are desired.

The S-shaped gas path in the turbine greatly reduces overall length, and the inward flow permits a structure in which radiation losses are greatly reduced, and in which the compressor discharge air separates the combustion chamber from the outside air, still further reducing heat loss. The use of airfoil bladings increases efficiency wherever used, and the structure as assembled leads to a system of internal cooling where needed without heat loss.

We claim:

1. A compressor having a rotor and a surrounding stator, a group of rotor and stator reaction type turbine blade rings, shaped to pass air axially along said rotor and stator, a centrifugal impeller mounted on said rotor and having substantially radially extending impeller blades, said stator forming an air passage with a portion of said rotor intermediate said group of turbine blade rings and said impeller, said passage at the entrance to said impeller being shaped to impart to said air from said turbine blades a radial component of flow into the spaces between said impeller blades to reduce entrance shock.

2. A compressor having a rotor and a surrounding stator, a group of rotor and stator reaction type turbine blade rings, shaped to pass air axially along said rotor and stator, a centrifugal impeller mounted on said rotor and having radially extending impeller blades, said stator forming an air passage with a portion of said rotor intermediate said group of turbine blade rings and said impeller, said passage at the entrance to said impeller being shaped to impart to said air from said turbine blades a radial component of flow into the spaces between said impeller blades to reduce entrance shock, the leading edges of said impeller blades being positioned substantially at right angles to said flow.

3. A compressor having a rotor and a surrounding stator, a group of rotor and stator reaction type turbine blade rings, shaped to pass air axially along said rotor and stator from said inlet, a centrifugal impeller mounted on said rotor and having substantially radially extending impeller blades, said stator forming an air passage with a portion of said rotor intermediate said group of turbine blade rings and said impeller, said passage being shaped to at least partially turn said flow from an axial direction to radial direction before striking the leading edges of said impeller blades to reduce entrance shock thereon.

4. In a compressor supplied with an axially moving airflow, a centrifugal impeller having radially extending blades, a shroud for said impeller, means on said shroud forming, with a basal portion of said impeller, a conduit directing air into said impeller blades, and an entry blade disposed in said conduit adjacent the impeller blades at an acute angle to the compressor shaft as viewed in the direction of said axial flow.

5. Apparatus in accordance with claim 1 wherein a second and similar impeller is provided on said rotor, said stator being shaped to form an annular conduit receiving air peripherally from the first impeller, and shaped to direct the peripheral air first axially, then inwardly radially and finally axially to deliver said air to the bases of the rotor blades of the second impeller, said conduit being shaped adjacent the bases of the rotor blades to deliver air thereto with a radial component of flow.

6. Apparatus in accordance with claim 1 wherein a second and similar impeller is provided on said rotor, said stator being shaped to form an annular conduit receiving air peripherally from the first impeller, and shaped to deliver the peripheral air first axially, then inwardly radially and finally axially to the base of the rotor blades of the second impeller, said conduit being shaped adjacent the bases of the rotor blades to deliver air thereto with a radial component of flow, said conduit being of substantially uniform sectional area between said impellers.

VLADIMIR H. PAVLECKA.
JOHN K. NORTHROP.